US009803958B2

(12) United States Patent
Wolfanger et al.

(10) Patent No.: US 9,803,958 B2
(45) Date of Patent: Oct. 31, 2017

(54) WEAPONS STORES PROCESSOR PANEL FOR AIRCRAFT

(75) Inventors: Justin L. Wolfanger, Naugatuck, CT (US); Carlo Asaro, Waterbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 669 days.

(21) Appl. No.: 13/401,993

(22) Filed: Feb. 22, 2012

(65) Prior Publication Data

US 2013/0218372 A1 Aug. 22, 2013

(51) Int. Cl.
| | | |
|---|---|---|
| F41G 3/22 | (2006.01) | |
| B64D 7/00 | (2006.01) | |
| B64C 27/04 | (2006.01) | |
| F41A 19/58 | (2006.01) | |
| F41G 7/00 | (2006.01) | |

(52) U.S. Cl.
CPC .............. *F41G 3/22* (2013.01); *B64D 7/00* (2013.01); *F41A 19/58* (2013.01); *F41G 7/007* (2013.01); *B64C 27/04* (2013.01)

(58) Field of Classification Search
CPC .... B64D 7/00–7/08; F42B 15/00; F41G 3/22; F41G 7/007; B64C 27/04; F41A 19/58
USPC ............. 244/3.1; 701/3; 89/37.16, 41.21, 89/1.51–1.59, 1.8–1.816, 132, 135–137, 89/28.05
See application file for complete search history.

(56) References Cited

U.S. PATENT DOCUMENTS

| | | | | | |
|---|---|---|---|---|---|
| 3,499,363 | A | * | 3/1970 | Lauro | 89/1.51 |
| 3,598,015 | A | * | 8/1971 | Delistovich et al. | 89/1.814 |
| 3,803,974 | A | * | 4/1974 | Everest et al. | 89/1.56 |
| 3,880,043 | A | * | 4/1975 | Cox et al. | 89/1.56 |
| 4,205,589 | A | * | 6/1980 | Engler et al. | 89/41.07 |
| 4,359,926 | A | * | 11/1982 | Sano et al. | 89/1.814 |
| 4,421,007 | A | * | 12/1983 | Hanes, Jr. | 89/1.11 |
| 4,481,858 | A | * | 11/1984 | Price | 89/11 |
| 4,494,438 | A | * | 1/1985 | Lighton et al. | 89/1.813 |
| 5,034,686 | A | * | 7/1991 | Aspelin | 324/537 |
| 5,036,465 | A | * | 7/1991 | Ackerman et al. | 235/400 |
| 5,036,466 | A | * | 7/1991 | Fitzgerald et al. | 235/400 |
| 5,080,300 | A | * | 1/1992 | Stubbs et al. | 244/3.11 |
| 5,091,847 | A | * | 2/1992 | Herbermann | 714/3 |
| 5,129,063 | A | * | 7/1992 | Sainola et al. | 710/1 |
| 5,206,455 | A | * | 4/1993 | Williams et al. | 102/201 |
| 5,542,334 | A | * | 8/1996 | Wells | 89/1.812 |

(Continued)

OTHER PUBLICATIONS

CNATRA P-1209, Flight Training Instruction, Weapons/Strike, Department of the Navy, Jul. 2009.*

(Continued)

*Primary Examiner* — Courtney Heinle
(74) *Attorney, Agent, or Firm* — Cantor Colburn LLP

(57) ABSTRACT

An aircraft weapons control system including a weapons stores processor panel for receiving input signals from a weapons input; a weapons interface for receiving fire signals from the weapons stores processor panel to control firing of aircraft weapons; and a flight management system in communication with the weapons stores processor panel and the weapons interface, the flight management system providing control signals to the weapons interface; wherein the weapons stores processor panel implements safety interlocks to prevent or enable firing of the aircraft weapons.

18 Claims, 3 Drawing Sheets

(56) References Cited

U.S. PATENT DOCUMENTS

| | | | |
|---|---|---|---|
| 5,591,031 A * | 1/1997 | Monk et al. | 434/14 |
| 5,799,899 A * | 9/1998 | Wells et al. | 244/3.11 |
| 5,983,286 A * | 11/1999 | Pakenham | 710/9 |
| 5,992,290 A * | 11/1999 | Quebedeaux et al. | 89/1.56 |
| 6,264,146 B1 * | 7/2001 | Hill et al. | 244/234 |
| 6,293,488 B1 * | 9/2001 | Wells et al. | 244/3.11 |
| 6,811,123 B1 * | 11/2004 | Foster et al. | 244/137.4 |
| 6,941,850 B1 * | 9/2005 | McMahon | 89/1.811 |
| 7,137,599 B1 * | 11/2006 | Sitzmann et al. | 244/137.4 |
| 7,654,186 B1 * | 2/2010 | Cope et al. | 89/6.5 |
| 8,453,571 B1 * | 6/2013 | Dutton et al. | 102/206 |
| 2002/0073334 A1 * | 6/2002 | Sherman et al. | 713/201 |
| 2003/0033059 A1 * | 2/2003 | Ebert et al. | 701/3 |
| 2003/0071165 A1 * | 4/2003 | Fiebick et al. | 244/3.1 |
| 2005/0183570 A1 * | 8/2005 | McMahon | 89/1.811 |
| 2005/0204910 A1 * | 9/2005 | Padan | 89/1.813 |
| 2006/0164261 A1 * | 7/2006 | Stiffler | 340/945 |
| 2007/0262206 A1 * | 11/2007 | Scott | 244/201 |
| 2008/0121097 A1 * | 5/2008 | Rudakevych et al. | 89/28.05 |
| 2008/0255730 A1 * | 10/2008 | Agrell | 701/45 |
| 2009/0085368 A1 * | 4/2009 | Coffelt et al. | 296/70 |
| 2010/0082183 A1 * | 4/2010 | Lassini et al. | 701/2 |
| 2010/0217899 A1 * | 8/2010 | Sitzmann et al. | 710/69 |
| 2010/0326264 A1 * | 12/2010 | Roemerman et al. | 89/1.56 |
| 2011/0225531 A1 * | 9/2011 | Irizarry | 715/771 |
| 2011/0308414 A1 * | 12/2011 | Sudick | 102/202.1 |
| 2012/0150365 A1 * | 6/2012 | Maxwell et al. | 701/3 |
| 2012/0152091 A1 * | 6/2012 | Roemerman et al. | 89/1.59 |
| 2012/0279382 A1 * | 11/2012 | Garrett et al. | 89/27.12 |
| 2013/0167746 A1 * | 7/2013 | Rastegar | 102/210 |

OTHER PUBLICATIONS

TM-1-1520-238-10, Technical Manual for Helicopter, Attack, AH-64A Apache.*

* cited by examiner

WEAPONS STORES PROCESSOR PANEL FOR AIRCRAFT

BACKGROUND

The subject matter disclosed herein relates generally to weapons control systems, and in particular to an integrated weapons stores processor panel for an aircraft.

Existing military aircraft (e.g., helicopters) may be fitted with a variety of weapons systems, such as guns, rockets, missiles, laser targeting, etc. Prior art designs used complex weapons control systems, often requiring a designated controller and large relay boxes for each weapon type. Outfitting an aircraft with a particular type of weapon required significant retrofit and significant weight added to the aircraft. Weapons installation is further complicated by the limited space on the aircraft control panel console in which to mount weapons control systems. Accordingly, improvements in weapons control systems would be well received in the art.

SUMMARY

One embodiment includes an aircraft weapons control system including a weapons stores processor panel for receiving input signals from a weapons input; a weapons interface for receiving fire signals from the weapons stores processor panel to control firing of aircraft weapons; and a flight management system in communication with the weapons stores processor panel and the weapons interface, the flight management system providing control signals to the weapons interface; wherein the weapons stores processor panel implements safety interlocks to prevent or enable firing of the aircraft weapons.

Another embodiment is a vertical takeoff and landing (VTOL) rotary-wing aircraft comprising: an aircraft mounted weapon; and an aircraft weapons control system, the aircraft weapons control system including: a weapons stores processor panel for receiving input signals from a weapons input; a weapons interface for receiving fire signals from the weapons stores processor panel to control firing of the aircraft weapon; and a flight management system in communication with the weapons stores processor panel and the weapons interface, the flight management system providing control signals to the weapons interface; wherein the weapons stores processor panel implements safety interlocks to prevent or enable firing of the aircraft weapon.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
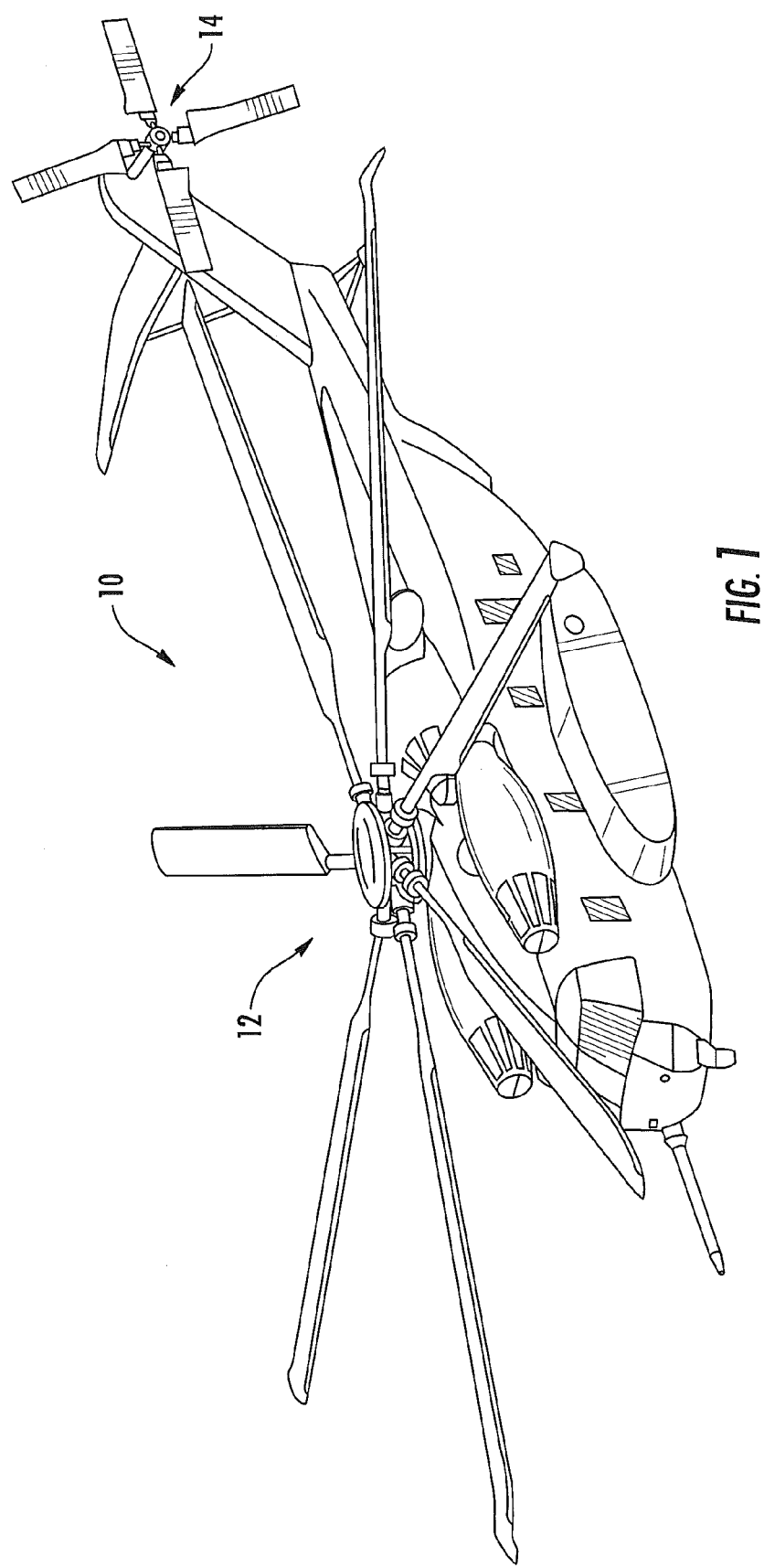
FIG. 1 is a perspective view of an exemplary rotary wing aircraft for use with embodiments of the invention.

FIG. 1 illustrates a general perspective view of an exemplary vehicle in the form of a vertical takeoff and landing (VTOL) rotary-wing aircraft 10 for use with embodiments of the invention. The rotary-wing aircraft 10 includes a main rotor assembly 12 and tail rotor assembly 14. Although a particular helicopter configuration is illustrated and described in disclosed embodiments, other configurations and/or machines, such as high speed compound rotary-wing aircraft with supplemental translational thrust systems, dual contra-rotating, coaxial rotor system aircraft, turbo-props, tilt-rotors, tilt-wing aircraft, and fixed-wing aircraft will also benefit from embodiments of the present invention.

Figure 2:
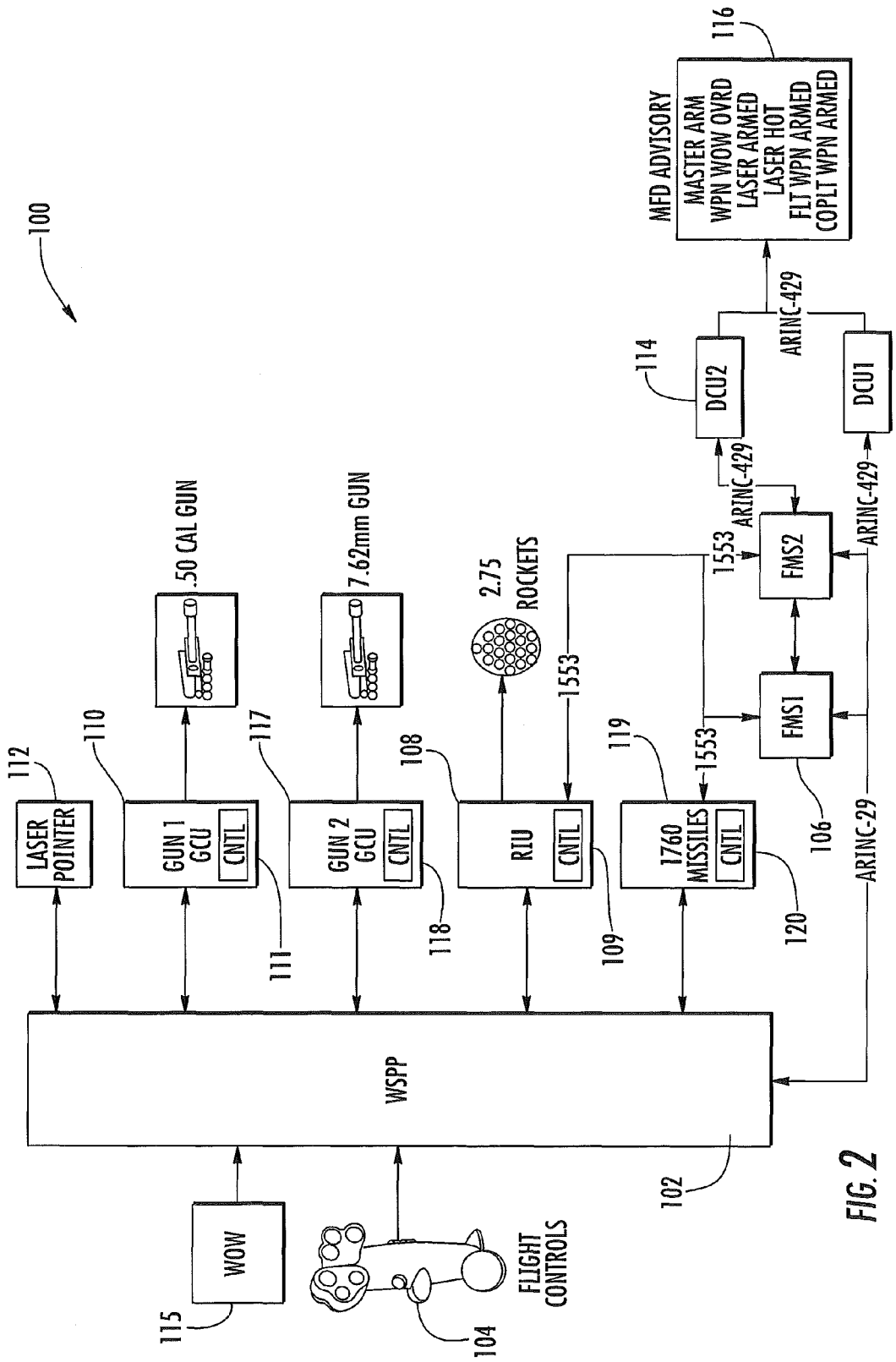
FIG. 2 depicts a weapons control system in exemplary embodiments.

In military applications, aircraft 10 may be fitted with one or more weapons systems. Embodiments provide an integrated weapons stores processor panel and part of a weapons control system to facilitate installation and operation of weapons systems. FIG. 2 illustrates a weapons control system 100 in exemplary embodiments. Weapons control system 100 includes a weapons stores processor panel 102 that provides weapons control and safety interlocks as described in detail herein. Weapons stores processor panel 102 may be implemented in hardware, software and/or a combination of both. In exemplary embodiments, weapons fire signals and weapons safety interlocks are implemented in hardware (e.g., logic gates, switches). Functional processing (e.g., communications with weapons input and flight management systems) is implemented via a microcontroller, in communication with the hardware.

Figure 3:
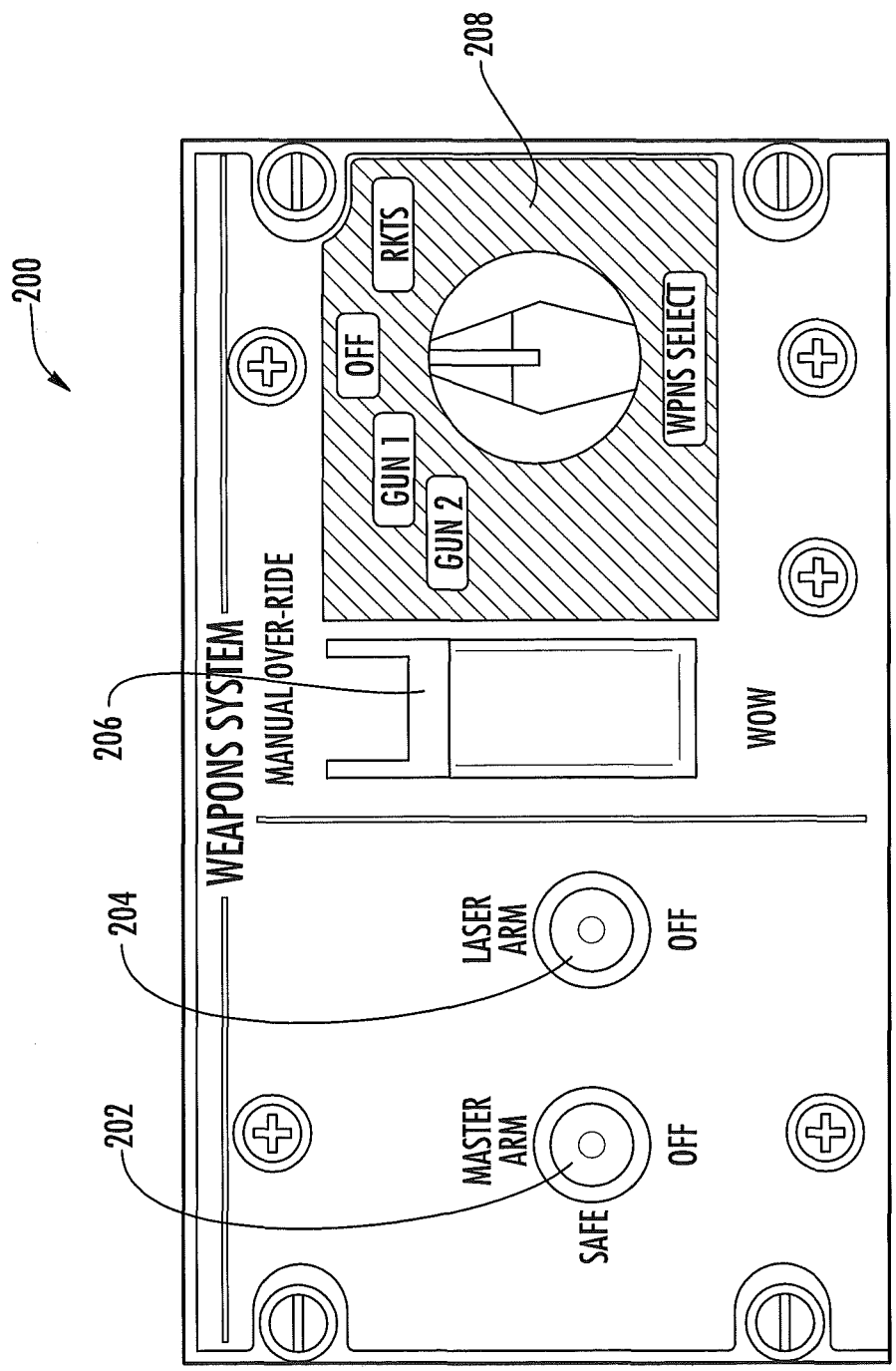
FIG. 3 depicts an exemplary control panel.

Weapons stores processor panel 102 receives inputs from a weapons input 104 and a weapons control panel 200 (FIG. 3). Weapons input 104 may be a flight controls grip used for flight control of a helicopter. Weapons stores processor panel 102 also communicates with flight management systems 106, which may include redundant flight management systems, as known in the art. Communication between the weapons stores processor panel 102 and flight management system 106 may be performed using know communication protocols (e.g., ARINC-429). One or more weapons interfaces 108, 110, 117, 119 are in communication with both the weapons stores processor panel 102 and the flight management system 106. Weapons interfaces 108, 110, 117, 119 fire weapons in response to commands from both the weapons stores processor panel 102 and the flight management system 106. In the embodiment show in FIG. 2, the weapons system includes 2.75 inch rockets and a first weapons interface 108 is a rocket interface unit (RIU). The weapons system also includes a .50 caliber gun and a second weapons interface 110 is a gun control unit (GCU). The weapons system also includes a .7.62 caliber gun and a third weapons interface 117 is a gun control unit (GCU). The weapons system also includes 1760 missiles and a fourth weapons interface 119 is a missile control unit.

First weapons interface 108 includes a controller 109 (e.g., a microprocessor-based controller), second weapons interface 110 includes a controller 111 (e.g., a microcontroller-based controller), third weapons interface 117 includes a controller 118 and fourth weapons interface 119 includes a controller 120. It certain modes, the weapons interface controllers 109, 111, 119 and 120 are provided with power, although fire signals from the weapons stores processor panel 102 may be disabled.

It is understood that other types of weapons may be interfaced with the weapons stores processor panel 102 through an appropriate weapons interface, such that multiple different types of weapons may be mounted to the aircraft and controlled through the weapons stores processor panel 102. In exemplary embodiments, the weapons stores processor panel 102 is configured to control weapons systems using the MIL-STD-1760 weapons control standard. It is understood that other weapons control standards may be used by weapons stores processor panel 102. Further, a laser pointer 112 for targeting may also be interfaced to the weapons stores processor panel 102.

Weapons control system 100 includes data concentrator unit 114 (which may also be redundant) that conditions outputs from the flight management system 106 for display on a multifunction display (MFD) 116 that is presented to the pilot, and copilot if present. The weapons stores processor panel 102 provides display information for a helmet mounted display, control display unit, and the multifunction function display 116. The weapons stores processor panel 102 also provides data for a weapons bus controller to implement firing of weapons.

FIG. 3 depicts an exemplary control panel 200 on the weapons stores processor panel 102. Control panel 200 includes inputs that dictate how the weapons stores processor panel 102 will process inputs from the weapons input 104 and a weight-on-wheels unit 115. The weight-on-wheels unit 115 detects when the aircraft is on the ground to disable weapons systems, unless overridden manually. A master arm switch 202 includes three positions. A master arm position instructs the weapons processor panel 102 to provide power to the weapons interface controllers 109, 111, 118, 120 and to enable the weapons stores processor panel 102 to generate fire signals. As described in further detail herein, the weapons stores processor panel 102 generates a fire signal (e.g., a 28 volt signal) necessary for the weapons interfaces 108, 110, 117, 119 to cause the weapon to fire. Through safety interlocks, the weapons stores processor panel 102 can prevent or enable generation of the fire signal.

The master arm switch 202 also includes a safe position. In the safe position, the weapons stores processor panel 102 provides power to weapons interface controllers 109, 111, 118, 120, but the weapons stores processor panel 102 cannot generate fire signals needed for the weapons interface 108, 110, 117, 119 to fire a weapon. This position allows the weapons interface 108, 110, 117, 119 to still communicate via the weapons interface controller 109, 111, 118, 120 with the weapons stores processor panel 102 and the flight management system 106, but does not enable firing of the weapon.

The master arm switch 202 includes an off position. In this position, no power is provided to the weapons interface controller 109, 111, 118, 120 and no fire signals are provided to the weapons interface 108, 110, 117, 119. In this mode, the weapons interface 108, 110, 117, 119 cannot communicate with flight management system 106.

Control panel 200 also includes a laser arm switch 204 having an on and off position. In the on position, a laser targeting device is powered through the weapons stores processor panel 102 and is activated by a trigger on the weapons input 104. Upon detecting a laser trigger pull on the weapons input 104, the weapons processor panel 102 provides an enable signal to the laser targeting device.

Control panel 200 includes an override switch 206. The default position for the override switch 206 is the weight-on-wheels (WOW) position. In this position, the weapons stores processor panel 102 prevents fire signals from being sent to the weapons interface 108, 110, 117, 119 if a WOW condition is detected by WOW unit 115. This prevents the weapons from firing when the aircraft is on the ground. The override switch 206 may be moved to a manual override position to allow the weapons stores processor panel 102 to provide fire signals to the weapons interface 108, 110, 117, 199 even when WOW is present. Moving override switch 206 to the manual override position may require removing a cover guard or other blocking member to prevent inadvertent selection of manual override. In the manual override mode, the weapons stores processor panel 102 commands the weapons interface 108, 110, 117, 119 directly, without reliance on the flight management system 106. As such, even if the flight management system 106 is experiencing faults or inactive, the pilot can still command weapons functions directly through the weapons stores processor panel 102.

Control panel 200 also includes a weapons select switch 208 which allows the operator to designate which weapons to fire in manual override mode. In the example in FIG. 3, the weapons select switch may select between rockets and guns. Based on the position of the weapons select switch 208, the weapons stores processor panel 102 sends fire signals to the appropriate weapons interface 108, 110, 117. Weapons select switch 208 also includes an off position in which the weapons stores processor panel 102 does not send any enable or fire signals to any weapons interface 108, 110, 117.

In operation, the weapons stores processor panel 102 communicates with the flight management system 106 to accomplish weapons control, but the weapons stores processor panel 102 is responsible for generating the fire signals required by the weapons interface 108, 110, 117, 119 to actually fire a weapon. For example, the pilot may pull a trigger on the weapons input 104 to fire a rocket. The flight management system 106 receives this input and provides a command to the weapons interface 108 to fire a rocket. The weapons interface 108 cannot fire a rocket until an enable and fire signal is received from the weapons stores processor panel 102. In this way, safety interlocks may be implemented in the weapons stores processor panel 102 regardless of commands from the flight management system 106.

The weapons stores processor panel 102 provides for integration of multiple weapons systems into one line replaceable unit. This conserves space and weight in the aircraft. The weapons stores processor panel 102 interfaces with the flight management system 106 to transfer data through the aircraft. This further simplifies the aircraft modification and allows for weapons to be installed on any aircraft as a kit, mounted in an aircraft console. The weapons processor panel 102 provides a combination of mission system integration along with system safety.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft weapons control system comprising:
   a weapons stores processor panel for receiving input signals from a weapons input;
   a weapons interface for receiving fire signals from the weapons stores processor panel to control firing of aircraft weapons;
   a flight management system in communication with the weapons stores processor panel and the weapons interface, the flight management system providing control signals to the weapons interface, the flight management system separate from the weapons stores processor panel; and a control panel on the weapons stores processor panel, the control panel including a master arm switch for selecting a master arm position, a safe position and an off position;

wherein the weapons stores processor panel implements safety interlocks to prevent or enable firing of the aircraft weapons, the weapons interface requiring an enable signal from the weapons stores processor panel to fire a weapon;

wherein when the master arm switch is in the master arm position, the weapons stores processor panel provides power to a weapons interface controller and the weapons stores processor panel enables generation of the fire signals;

wherein when the master arm switch is in the safe position, the weapons stores processor panel provides power to a weapons interface controller and the weapons stores processor panel prevents generation of the fire signals;

wherein when the master arm switch is in the off position, the weapons stores processor panel disables power to a weapons interface controller and the weapons stores processor panel prevents generation of the fire signals.

2. The aircraft weapons control system of claim 1 wherein:
the weapons interface includes a first weapons interface to a first weapon and a second weapons interface to a second weapon, the first weapon and the second weapon being of different types.

3. The aircraft weapons control system of claim 2 wherein:
the weapons interface includes a third weapons interface to a third weapon and a fourth weapons interface to a fourth weapon, the third weapon and the fourth weapon being of different types.

4. The aircraft weapons control system of claim 1 wherein:
the weapons stores processor panel communicates with the weapons interface using a MIL-STD-1760 standard.

5. The aircraft weapons control system of claim 1 further comprising:
a laser pointer coupled to the weapons processor panel.

6. The aircraft weapons control system of claim 1 further comprising:
a data concentrator unit that conditions outputs from the flight management system for display on a multifunction display.

7. The aircraft weapons control system of claim 1 wherein:
the control panel also includes a laser arm switch for powering a laser pointer through the weapons stores processor panel.

8. The aircraft weapons control system of claim 1 wherein:
the control panel includes an override switch for having a weight-on-wheels (WOW) position and a manual override position.

9. The aircraft weapons control system of claim 8 wherein:
when the override switch is in the manual override position, the weapons stores processor panel commands the weapons interface directly, without reliance on the flight management system.

10. The aircraft weapons control system of claim 1 wherein:
the control panel includes a weapons select switch which designates a weapon to fire, the weapons select switch including an off position in which the weapons stores processor panel disables fire signals to the weapons interface.

11. The aircraft weapons control system of claim 1 wherein:
the weapons stores processor panel provides display information for a helmet mounted display, control display unit, and a multifunction function display.

12. The aircraft weapons control system of claim 1 wherein:
the weapons stores processor panel provides data for a weapons bus controller to implement firing of weapons.

13. A vertical takeoff and landing (VTOL) rotary-wing aircraft comprising:
an aircraft mounted weapon; and
an aircraft weapons control system, the aircraft weapons control system including:
a weapons stores processor panel for receiving input signals from a weapons input; a weapons interface for receiving fire signals from the weapons stores processor panel to control firing of the aircraft weapon;
a flight management system in communication with the weapons stores processor panel and the weapons interface, the flight management system providing control signals to the weapons interface, the flight management system separate from the weapons stores processor panel; and
a control panel on the weapons stores processor panel, the control panel including a master arm switch for selecting a master arm position, a safe position and an off position;
wherein the weapons stores processor panel implements safety interlocks to prevent or enable firing of the aircraft weapon, the weapons interface requiring an enable signal from the weapons stores processor panel to fire a weapon;
wherein when the master arm switch is in the master arm position, the weapons stores processor panel provides power to a weapons interface controller and the weapons stores processor panel enables generation of the fire signals;
wherein when the master arm switch is in the safe position, the weapons stores processor panel provides power to a weapons interface controller and the weapons stores processor panel prevents generation of the fire signals;
wherein when the master arm switch is in the off position, the weapons stores processor panel disables power to a weapons interface controller and the weapons stores processor panel prevents generation of the fire signals.

14. The rotary-wing aircraft of claim 13 further comprising:
a laser pointer coupled to the weapons stores processor panel.

15. The rotary-wing aircraft of claim of claim 13 wherein:
the control panel also includes a laser arm switch for powering a laser pointer through the weapons stores processor panel.

16. The rotary-wing aircraft of claim of claim 13 wherein:
the control panel includes an override switch for having a weight-on-wheels (WOW) position and a manual over-ride position.

17. The rotary-wing aircraft of claim 16 wherein:
when the override switch is in the manual override position, the weapons stores processor panel commands the weapons interface directly, without reliance on the flight management system.

18. The rotary-wing aircraft of claim 13 wherein:
the control panel includes a weapons select switch which designates a weapon to fire in a manual over-ride mode, the weapons select switch including an off position in which the weapons stores processor panel disables fire signals to the weapons interface.

* * * * *